US008307894B2

(12) United States Patent
Wallace

(10) Patent No.: US 8,307,894 B2
(45) Date of Patent: Nov. 13, 2012

(54) COMPOSITION AND METHOD FOR INHIBITING THE DELETERIOUS EFFECTS OF SULFATE REDUCING BACTERIA

(76) Inventor: Jon Wallace, Weatherford, TX (US)

( * ) Notice: Subject to any disclaimer, the term of this patent is extended or adjusted under 35 U.S.C. 154(b) by 333 days.

(21) Appl. No.: 12/871,458

(22) Filed: Aug. 30, 2010

(65) Prior Publication Data

US 2011/0056693 A1 Mar. 10, 2011

Related U.S. Application Data

(60) Provisional application No. 61/239,820, filed on Sep. 4, 2009.

(51) Int. Cl.
*E21B 43/22* (2006.01)

(52) U.S. Cl. ..................... 166/246; 166/305.1

(58) Field of Classification Search ......................... None
See application file for complete search history.

(56) References Cited

U.S. PATENT DOCUMENTS

| 4,605,069 | A | | 8/1986 | McClaflin et al. | |
| 4,740,320 | A | | 4/1988 | Treybig et al. | |
| 6,164,244 | A | * | 12/2000 | Cutler et al. | 119/215 |
| 7,060,486 | B2 | | 6/2006 | Wood et al. | |
| 2009/0162453 | A1 | * | 6/2009 | Kawahara et al. | 424/632 |

OTHER PUBLICATIONS

Grigoryan, Aleksander A., et al., 'Competitive Oxidation of Volatile Fatty Acids by Sulfate—and Nitrate-Reducing Bacteria from an Oil Field in Argentina', Applied and Environmental Microbiology, Jul. 2008, p. 4324-4335, vol. 74, No. 14, American Society for Microbiology.
Heidelberg, John F., et al., "The Genome Sequence of the Anaerobic, Sulfate-Reducing Bacterium *Desulfovibrio vulgaris* Hildenborough," Nature Biotechnology, Apr. 11, 2004, p. 1-13, Nature Publishing Group.
Bogan, Bill W., et al., "Development of an Environmentally Benign Microbial Inhibitor to Control Internal Pipeline Corrosion," Dec. 2004, p. i-59, Gas Technology Institute.
Economides, Michael J; Martin, Tony; "Modern Fracturing—Enhancing Natural Gas Production" publication; copyright 2007 BJ Services Company; 4 pages, pertinent p. 228, Houston, TX.
ScienceDaily webpage: "Decoding a Sulfate-Breathing Bug," 2 pages; Jan. 31, 2009; www/sciencedaily.com.
Corrosion and Materials Technology; Sulfate Reducing Bacteria (SRB), Article, 3 pages www.clihousion.com/Knowledge-base/sulfate-reclucing-bacteria-srb.htlm, Mar. 15, 2009.
Sigma-Aldrich; "Material Safety Data Sheet." Sigma-R8875: Mar. 10, 2004, Version 1.2 ww.sigma-aldrich.com.
The Biochemistry Question Site; "Inhibitors of the Electron Transport Chain" 6 pages, Nov. 18, 2006.
Wikipedia; "Rotenone," 3 pages http://en.wiltipedia.org./wiki/Rotenone. retrieved Sep. 20, 2012.

* cited by examiner

*Primary Examiner* — Angela M DiTrani
(74) *Attorney, Agent, or Firm* — Charles D. Gunter, Jr.

(57) ABSTRACT

A method for reducing the deleterious effects of sulfate reducing bacteria in aqueous environments, particularly those in which metal materials are exposed to the microorganisms. A treatment solution containing rotenone is introduced into the aqueous environment. The rotenone is present in the treatment fluid in an amount which is sufficient to inhibit the growth of sulfate reducing bacteria on the metal material.

5 Claims, No Drawings

COMPOSITION AND METHOD FOR INHIBITING THE DELETERIOUS EFFECTS OF SULFATE REDUCING BACTERIA

CROSS-REFERENCE TO RELATED APPLICATION

The present application claims priority from Provisional Application Ser. No. 61/239,820, filed Sep. 4, 2009, with the same title, by the same inventor.

BACKGROUND OF THE INVENTION

1. Field of the Invention

This invention relates generally to the prevention or inhibition of the deleterious effects of sulfate reducing bacteria in aqueous environments, including both the contamination of process water and also the degradation and corrosion damage caused to metals and other material surfaces in contact with sulfate reducing bacteria, as often occurs in well drilling and production operations.

2. Description of the Prior Art

Both overall water quality and the degradation and corrosion damage to material infrastructures exposed to aqueous environments are ever growing concerns in today's world in a variety of different settings. Scientists now understand that microbes contribute significantly to degradation and corrosion damage. When surfaces, and particularly metals, are exposed to natural environments, they are rapidly colonized by aerobic bacteria present in the surrounding liquid environment which form a "biofilm." The upper layers of this biofilm are thought to be aerobic while the regions near the metal surface are thought to be anaerobic due to the depletion of oxygen by the biofilm. Sulfate Reducing Bacteria (herein referred to as "SRB") can colonize these anaerobic niches and thus contribute to corrosion even in an aerobic environment. SRB have been implicated in the deterioration of metals in a wide range of environments including pipelines and off-shore oil rigs in the oil and shipping industries. However, other environments are affected, as well, including cooling water recirculation systems in industrial settings and sewage treatment facilities and pipelines, to name a few. SRB can act in these and other systems to cause corrosion of a wide range of metals including low-grade carbon steels, but also including stainless steels, and other metals and metal alloys of the type which are commonly used in the chemical process, shipping, and power industries. SRB also cause various deleterious effects on nonmetallic systems and materials in some environments.

The complete nature of the operation of these microorganisms in causing damage to a variety of common infrastructure is not fully understood. However, it is known that SRB produce hydrogen sulfide, which is then metabolized by sulfur-oxidizing organisms such as *Thiobacillus* into sulfuric acid. Sulfuric acid degradation due to bacteria has been found to cause billions of dollars of corrosion damage in the U.S. each year alone.

Conventional corrosion inhibition strategies have included a variety of different strategies including, to name a few, modification in the pH, redox potential, and resistivity of the soil in which the equipment is to be installed, inorganic coatings, cathodic protection, and the use of "traditional" biocides. Inorganic protective coatings like paints and epoxies have been used extensively in the past; but, they are not permanent, and the cost of maintaining and replacing them is substantial. With cathodic protection, the cathodic reaction is stimulated on the metal surface by coupling it to a sacrificial anode, or by supplying an impressed current from an external power supply through a corrosion-resistant anode. Many of these strategies are not practical in well completion and production operations, however.

Traditional biocides have been used extensively to retard the corrosion reaction in closed systems such as cooling towers and storage tanks and are probably the most common method of combating biocorrosion. Oxidizing biocides like chlorine, chloramines, and chlorinating compounds are used in freshwater systems. Chlorine compounds are generally thought to be the most practical biocides; however, their activity depends on the pH of the water and the extent of light and temperature and they may not always be effective against biofilm bacteria. Non-oxidizing biocides such as quartenary salts, amine-type compounds, anthraquinones, and aldehydes are more stable and can be used in a variety of environments. Use of these biocides suffer from a number of serious drawbacks, including not only the cost of the biocides themselves, but also the environmental cost of releasing large quantities of these inorganic compounds into the water supply.

What is needed in the art is an effective, environmentally friendly, and economically acceptable means to prevent or inhibit SRB-caused water contamination and/or material infrastructure corrosion or degradation, with lessened release of toxic agents into the surrounding environment.

SUMMARY OF THE INVENTION

The present invention is directed toward prevention or inhibition of the deleterious effects of sulfate reducing bacteria through the use of a naturally occurring composition which can he used to treat aqueous environments and materials without the disadvantage of releasing large quantities of inorganic compounds into the water supply. The environmentally friendly composition used in practicing the method of the invention provides an effective, environmentally friendly, economical means to prevent or inhibit SRB-caused corrosion or degradation, with lessened release of toxic agents into the environment. By preventing the effects of corrosion, aqueous environments exposed to, for example, metal materials, are less likely to become contaminated or polluted. The method of the invention is preferably used to inhibit the growth of sulfate-reducing bacteria on metals, such as the metals used in well completion and production operations, but can also be used on concrete, mortar, and other surfaces subject to corrosion or degradation.

The method of the invention, in one of its forms, is used to inhibit the deleterious effects of sulfate reducing bacteria in aqueous environments, the method involving the steps of adding a selected amount of the chemical compound rotenone to the aqueous environment. The environment is monitored periodically with the rotenone being added in an amount sufficient to reduce the growth of the sulfate reducing bacteria in a statistically significant manner in comparison to a control group.

The method of the invention also provides a process for inhibiting corrosion of a material used in well completion or production operations. The method includes the steps of contacting the material with a treatment solution containing, as an active antimicrobial agent, rotenone. The rotenone is present in the treatment solution in an amount sufficient to inhibit the growth of sulfate reducing bacteria on the material. The material being treated with the treatment solution will typically be selected from among such metals as iron, low-grade carbon steels, stainless steels, aluminum, titanium copper and alloys thereof.

The method of the invention, in its preferred form is used to inhibit corrosion of a metal composition in contact with a down hole well fluid. An effective amount of an antimicrobial agent is added to the down hole well fluid. The antimicrobial agent comprises rotenone, the rotenone being present in the down hole well fluid in an amount sufficient to inhibit the growth of sulfate reducing bacteria on the metal. The antimicrobial agent is preferably added to the well fluid at the surface and is then circulated in the well fluid to a down hole location.

Additional objects, features and advantages will be apparent in the written description which follows.

DETAILED DESCRIPTION OF THE INVENTION

The Problem to be Addressed:

Corrosion is a problem affecting metals. But other materials can also be seriously affected by degradation related to colonization of the material by SRB. As has been briefly discussed, SRB produce hydrogen sulfide as a product of their metabolism. Sulfide attacks iron and metal alloys, including stainless steels, and oxidizes copper and its alloys. The hydrogen sulfide is available to be oxidized to sulfate by any of a number of sulfur-oxidizing organisms, such as *Thiobacillus*, which produce sulfuric acid. Sulfuric acid formed in this manner has been found responsible, for example, for the degradation of concrete water channels, greatly reducing the expected service life of, for example, municipal concrete water control systems. In the North Texas region, however, an area of particular concern is the damage caused by SRB in natural gas well drilling and completion operations, particularly with regard to the contamination of the water which is necessary for such operations.

The demand being placed at present and into the future on available water resources is a matter of great concern. In the North Texas region, these demands include those imposed by oil and gas well completion and production operations. At the same time, these operations present new opportunities and revenue possibilities being generated for the local economy through the Barnett Shale and other oil and natural gas exploration activities. Greatly increased natural gas production is one key to a national policy for gaining energy independence, when considered in conjunction with, for example, wind, solar, nuclear and other forms of energy.

The world's energy producers can avoid costly mistakes by keeping a close watch on the Barnett Shale, and other producing areas, for emerging technologies to be proven out before being implemented in other shale plays. Numerous water related issues need to be addressed in this regard. As one example, a very visible aspect of the general public's concern with present day oil and gas production activities is the problem caused by the heavy truck traffic derived from hauling so many tens of thousands of gallons of water each day to and from well sites. If frac "flow back water" could be recycled at one well site to the point that it could be used on the next well just down the road, then the need for water hauling truck traffic could be greatly reduced. Recycled water could be used to frac the next well in line, and thus less water would be demanded from municipal sources.

As has been discussed above, the effects of Sulfate Reducing Bacteria (SRB) greatly impacts the safety and integrity of oilfield equipment and production efficiencies of natural gas due to its ability to produce Hydrogen Sulfide gas. Natural gas currently provides about 25% of all energy used in the United States. While there are many alternative fuels—coal, wind, solar, water, biomass fuels, and most importantly, conservation and more efficient use of energy—these, by themselves, will not meet demand for power in the foreseeable future. Therefore, the demand for natural gas will continue to rise. However, like everything else, natural gas production comes at a cost.

Shale gas is now recognized as the fastest-growing sector in the United States energy industry. From drilling the first well in 1981, through Apr. 5, 2007, over 6,500 vertical, deviated or horizontal Barnett test or producing wells have been drilled. Over 6,000 are listed as active wells. A Barnett Shale well is expected to produce for 20 to 30 years or more according to the Barnett Shale Education Council. Quoting from their reports:

"The Barnett Shale ranges from 3,500 ft. deep and 150 ft. thick to the South and West in Erath County to over 8,000 ft. deep and 1,000 ft. thick to the North in Denton County." The trend for the Barnett is to be oilier to the north and west is well documented and is a function of thermal maturity." "The best 5% of Barnett wells are located within the central part of the area, away from the major faults." "Some percentage of sulfides (usually in the form of pyrite) and phosphates are generally present in these types of shale reservoirs."

The Barnett Shale of the Fort Worth Basin is the most active shale gas play in the United States. The first Barnett Shale well was completed in 1981 in Wise County. Barnett Shale Completions are up to 8,000 feet deep. The thickness of the Barnett varies from 100 to 1,000 feet, but most economic wells are located where the shale is between 300 and 600 feet thick. In 2007, the Barnett shale (Newark East) gas field produced 1.11 trillion cubic feet of gas, making it the second-largest source of natural gas in the United States. According to Wall Street Resources of Palm City, Fla., "It is estimated that the market opportunity for recycling water in the shale basins exceeds $7 Billion to the year 2025.

According to the Texas Railroad Commission, while the volume of gas-in-place is large in the Barnett Shale (estimated to be over 27 trillion cubic feet); recovery of the gas is difficult because of the low permeability of the shale. In order to be able to produce gas at volumes that are economical, reservoirs with low permeability must be treated. One method of treatment to increase permeability is fracture treatment or "fracing" which increases the available surface area by creating fractures that are "propped up" or held open by the propping agents present in the fracturing fluid.

Defining Hydraulic Fracturing:

Shale reservoirs thus typically require hydraulic fracturing to be economically viable. Hydraulic fracturing consists of pumping into the formation very large volumes of fresh water that generally has been treated with a friction reducer, biocides, scale inhibitor, surfactants, and contains sand as a propping agent. Hydraulic fracturing began has been used for a number of years and uses an average of 3.5 million gallons per horizontal well. Wells may be re-fractured multiple times after producing for several years. "The main functions of a fracturing fluid are to create and extend the fracture, transport proppant through the mixing and pumping equipment and into the fracture, and place the proppant at the desired location in the fracture." "Modern Fracturing" p.228.

According to the Petroleum Technology Transfer Council, a recent study suggests that approximately 35,000 hydraulic fracture treatments will be pumped per year through 2025 and that 75% to 79% of all new gas production in the U.S. will be produced from wells that have been hydraulically fractured. Approximately 3-5 million (71,500-120,000 barrels) of water are used for each natural gas well and 30% of the water used to "frac" a gas well flows back in the first 2-3 weeks.

Assuming 35,000 hydraulic "frac" treatments per year at 100,000 barrels of frac water, this translates into 3.5 billion barrels of fracture water that will flow back to the surface every year to 2025 and will need to be treated, one third of which or 1.16 billion barrels will be considered frac flow back water and the remaining 2.34 billion barrels classified as produced water. At a price of $2.10 per barrel, this translates into a market opportunity of ($2.44 billion for frac flow back water and $4.91 billion of produced water) $7.35 billion in the major U.S. shale gas basins.

"Flow back water" is a useless gray, gooey broth contaminated by salt, sand, and various chemicals. The Federal Chemical Safety Board has classified drilling wastewater as a flammable material. Both the flow-back and the produced water from shale drilling are highly corrosive to metals and harmful to land, vegetation, and other living organisms including humans. Millions of gallons of polluted water are produced daily.

How Long Will Disposal Wells be Safe?

Improper drilling or completion of a disposal well can pollute the ground water during the injection process itself or later if the polluted water migrates upward into the ground water or onto the surface. According to Chesapeake Energy, there are currently more than 50,000 Class II injection wells and over 11,700 active saltwater disposal wells operating in Texas Traditional Methods to Handle Water in Gas Drilling:

Water is transported from the gas well to the disposal well typically done by air-polluting, road-damaging trucks. A single well will have more than 100 water-haulers servicing the well during fracture stimulation. Traffic accidents, associated spills, and driver/passenger injuries are a further risk. Frac water is typically purchased from municipalities to the drilling site for an all-in cost of approximately $1.50 per barrel. The cost to remove the frac flowback water and to dispose of the water (deep hole injection or above ground storage pits) is approximately $4.00 per barrel for a round trip cost of approximately $5.50 per barrel. Assuming that the gas driller is using 100,000 barrels to frac a well, the cost of water acquisition/transportation/disposal per well is approximately $500,000.

Other Methods to Handle Polluted Water:

Handling polluted water through pipelines is another method. However, pipeline leaks and ruptures are possible with possible environmental damage being done before a leak or rupture is discovered. Storage of polluted water in open pits until moved to a disposal well is also a potential hazard as well.

How Much Water is Being Used Per Year for Natural Gas Production?

The following is an example of how much water was used in the year 2005.

The Texas Railroad Commission estimates that, in 2005, approximately 82,190,00 barrels of water were used for hydraulic fracturing of the Barnett Shale, equaling about 10,592 acre feet of water. These figures are only estimates based on voluntary submittal from oil and gas companies. At 42 gallons per barrel, 42×82,190,000=3,451,980,000 gallons of water used in 2005.

The Present Invention:

The invention provides a method for inhibiting the deleterious effects of SRB's in aqueous environments, and particularly to a method of inhibiting the growth of SRB on a corrosion or degradation sensitive material in an aqueous environment. The method comprises, in one of its forms, adding a selected amount of the chemical compound rotenone to the aqueous environment, the rotenone being added in an amount sufficient to inhibit the growth of the sulfate reducing bacteria in the aqueous environment. In another aspect of the invention, the method comprises applying to a corrosion or degradation sensitive material, the compound rotenone. The rotenone is preferably applied as a solution of rotenone in an aqueous carrier, the rotenone being present in an amount sufficient to inhibit the growth of SRB on the material. The corrosion sensitive material can be a metal, such as iron, aluminum, titanium, copper, or their alloys. For example, the metal can be iron, a mild steel or one of the various stainless steels. In some situations, the degradation sensitive material may be a non-metallic material, such as concrete, reinforced concrete, or cement.

In the case of well water, the present inventive method provides a cleaner source of recycled water which could be used for livestock, agriculture, and industrial uses, reducing the truck traffic for water disposal and the need to inject polluted water into a deep disposal well. As the cost of water and water disposal increases, water recycling will become more cost-effective.

As used herein, "mild steel" refers to an inexpensive, low grade steel commonly used for piping and the like. As used herein, "corrosion sensitive material" includes all metals subject to corrosion, specifically including iron, aluminum, titanium, copper, nickel, and alloys of each of these, including mild steel and stainless steels. "Corrosion" applies specifically to damage to metals, while "degradation" refers to damage of other materials, such as concrete, cement, mortar and like materials. Thus, as used herein, a "degradation sensitive material" is a non-metal subject to damage from bacterial-related causes. For convenience of reference, however, as used herein, the term "corrosion" can also encompass damage to materials other than metals, unless otherwise required by context.

As used herein, the term "antimicrobial agent" means a chemical compound or composition which has a growth inhibitory effect on a microorganism which can cause corrosion of metal or degradation of a non-metallic material.

The term "applying" is intended to encompass any convenient means by which a treatment solution is brought into contact with the surface in question and includes, as appropriate in the context, contacting, spraying, brushing, hosing, or dripping a treatment solution of rotenone onto the corrosion or degradation sensitive material, or otherwise bringing the rotenone in contact with the material in question.

The phrase "in an amount sufficient to inhibit the growth of sulfate-reducing bacteria" means an amount sufficient to reduce the growth of such bacteria in a statistically significant manner in comparison to a control population. The range can be as low as the limit of the ability to detect a statistically significant difference up to complete inhibition. Preferably, the degree of inhibition is at least about 10%, meaning that the growth of such bacteria is at least about 10% less than the growth of the control population. More preferably, the degree of inhibition is about 30 to 50%. Even more preferably, the degree of inhibition is about 50 to 90%. Most preferably, the degree of inhibition is 90% or greater.

The Operation of the Invention in Controlling the Undesirable Effects of SRB's:

SRB's play a major role in degradation of oilfield equipment, holding tanks and transmission lines. SRB's are abundant in oil fields, and their metabolism has many negative consequences for the petroleum industry (e.g., corrosion of drilling and pumping machinery and storage tanks, souring of oil by sulfide production, plugging of machinery and rock pores with biomass and sulfide precipitates). (See, "The Genome Sequence of the Anaerobic, Sulfate-reducing Bacterium *Desulfovibrio Vulgaris*"—Nature Biotechnology Magazine—Apr. 11, 2004).

A number of different technical papers have been written on the chemical mechanism by which SRB's work. In the case of *Desulfovibrio vulgaris*, a common sulfate-breathing microorganism which has been studied in the prior art, it is postulated that the electron donor is hydrogen (hydrogenase-mediated); in the presence of ATP (Adenosine-5'-triphosphate), a nucleotide useful in cell biology, these bacteria convert adenosine phosphosul fate (APS), into thiosulfate, which is reduced to hydrogen sulfide, which is then excreted. In simpler terms, the sulfate-reducing bacteria derives energy from oxidizing hydrogen or organic molecules in the absence of oxygen by reducing sulfur or sulfate to hydrogen sulfide. SRB's derive energy for growth by coupling the oxidation of oil organics in formation waters with the reduction of sulfate, present in the injection water to sulfide. As will be explained in the discussion which follows, it is theorized that rotenone in the treatment fluid acts to inhibit the respiration of the microorganisms in question, thereby limiting their growth.

"A common sulfate-breathing bacterium is *Desulfovibrio vulgaris*, plays a major role in a process called microbially-influenced corrosion (MIC), which has caused staggering economic losses in the petroleum industry and at other industrial sites around the world", according to a Science Daily article Apr. 14, 2004. "Some sulfate-reducing bacteria produce hydrogen sulfide, which can cause sulfide stress cracking."—Wikipedi SRB reduce sulfate to sulfide, which usually shows up as hydrogen sulfide or, if iron is available, as black ferrous sulfide. In the absence of sulfate, some strains can function as fermenters and use organic compounds such as pyruvate to produce acetate, hydrogen, and carbon dioxide. Many SRB strains also contain hydrogenase enzymes, which allow them to consume hydrogen. Most common strains of SRB grow best at temperatures from 25° to 35° C. A few thermophilic strains capable of functioning efficiently at more than 60° C. have been reported. (Article from NACE—National Association of Corrosion Engineers).

*Desulfovibrio* is a model for the study of sulfate-reducing bacteria, which use hydrogen, organic acid, or alcohols as electron donors to "reduce" (that is, add electrons to) certain metals. (Science Daily Apr. 14, 2004). "Much of our historical knowledge on SRB physiology derives from a desire to understand the bacteria's role in microbially influenced corrosion, which may involve electron transport from the metal surface to the SRB sulfate reduction pathway through a hydrogen intermediate. The genome sequence reveals multiple candidate hydrogenases and cytochromes that may be involved in the removal of hydrogen from metals through electron transfer. It has been postulated that microbial metabolism may indirectly contribute to the accumulation of corrosive sulfide and organic acid end-products causing localized pitting of metals. Maximum corrosion activity occurs at sites of intermittent oxygenation, thus supporting the conclusion that corrosion by these anaerobes occurs along an oxygen gradient, directly or through a series of redox intermediates." (Taken from "The Genome Sequence of the Anaerobic, Sulfate-reducing Bacterium *Desulfovibrio Vulgaris*"—Apr. 11, 2004).

Practice of the Invention:

The present invention uses the chemical compound rotenone in a treatment fluid to prevent the deleterious effects of SRB's in aqueous environments, or where SRB's are present in contact with susceptible materials, usually metals. Rotenone is an odorless nonsynthetic chemical that is used as a broad-spectrum insecticide, piscicide (poisonous to fish), and pesticide. Rotenone is used in powdered or emulsified liquid form in fisheries management to remove unwanted fish species. Only small quantities are used and it has only minor and transient environmental side-effects. The compound breaks down when exposed to sunlight and usually has a short lifetime of six days in the environment. In water rotenone may last six months. It is mildly toxic to humans and other mammals, but extremely toxic to insects and aquatic life including fish.

According to the Material Data Safety Sheet available from Sigma-Aldrich, rotenone has the following published specifications:

Chemistry:
Molecular formula $C_{23}H_{22}O_6$
Molar mass 394.41
Appearance Colorless to red
Density 1.27 g/cm$^3$ @ 20° C.
Melting point 165-166° C.
Boiling point 210-220° C. at 0.5 mmHg
Solubility Soluble in ether and acetone, slightly soluble in ethanol.

Although the exact theory of operation may not be fully understood, rotenone is thought to work by interfering with the electron transport chain in mitochondria. Specifically, it inhibits the transfer of electrons from iron-sulfur centers in complex I to ubiquinone. This prevents NADH from being converted into usable cellular energy (ATP). Ubiquinone is a coenzyme in the respiratory (electron transport) chain in mitochondria, also known as coenzyme Q or mitoquinone; widely distributed in nature. (Answers.com). NADH dehydrogenase is an enzyme located in the inner mitochondrial membrane that catalyzes the transfer of electrons from NADH to coenzyme Q (CoQ). It is also called the NADH: quinone oxidoreductase. (Wikipedia).

In a government study entitled, "Development of an Environmentally Benign Microbial Inhibitor to Control Internal Pipeline Corrosion" by the U.S. Department of Energy and Gas Research Institute (12/04) found that of the compounds tested, hexane, extracts of *Capsicum* pepper plants (e.g.—Chile de Arbol and Serrano peppers) and molybdate were possible candidates as inhibitors of sulfate reducing bacteria. The pepper compounds were exacted from the seeds and pods of the pepper plants of the genus *Capsicum*. The results obtained in this project are consistent with the hypothesis that any compound that disrupts the metabolism of any of the major microbial groups present in corrosion-associated biofilms shows promise in limiting the amount/rate of corrosion. The results showed that with a very brief contact time of less than one minute the pepper extracts were capable of killing planktonic *D. vulgaris*. This approach parallels that of the present inventive method in using a more environmentally friendly agent, rotenone, to disrupt the metabolic processes of the undesirable microorganisms in question.

Advantages of the Invention:

An invention has been provided with a number of advantages. The present inventive approach of using rotenone for controlling microbially influenced corrosion (MIC) by controlling the metabolism of biofilms is more environmentally benign than the current approach involving the use of potent biocides (e.g.—Glutaraldehyde). In the case of well drilling and production operations, putting cleaner water down hole should result in more manageable water coming out of the well bore. The recycled water could be used for livestock, agriculture, and industrial uses, reducing truck traffic for water disposal and the need to inject polluted water into a deep disposal well. The end results are reduced water usage, reduced truck traffic to the well site and reduction in the risks associated with deep well injection of the well flow back water, to name a few.

While the invention has been shown in only one of its forms, it is not thus limited but is susceptible to various changes and modifications without departing from the spirit thereof.

What is claimed is:

1. A method of inhibiting the deleterious effects of sulfate reducing bacteria in aqueous environments, the method comprising the steps of:

adding a selected amount of the chemical compound rotenone to the aqueous environment, the rotenone being added in an amount sufficient to inhibit the growth of the sulfate reducing bacteria in the aqueous environment.

2. A method for inhibiting corrosion of a material used in well completion or production operations, the method comprising the steps of:

contacting the material with a treatment solution containing, as an active antimicrobial agent, rotenone, the rotenone being present in the treatment solution in an amount sufficient to inhibit the growth of sulfate reducing bacteria on the material.

3. The method of claim 2, wherein the material is a metal selected from the group consisting of iron, low-grade carbon steels, stainless steels, aluminum, titanium copper and their alloys.

4. A method for inhibiting corrosion of a metal composition in contact with a down hole well fluid, the method comprising the steps of:

adding an effective amount of an antimicrobial agent to the down hole well fluid, the antimicrobial agent comprising rotenone, the rotenone being present in the down hole well fluid in an amount sufficient to inhibit the growth of sulfate reducing bacteria on the metal.

5. The method of claim 4, wherein the antimicrobial agent is added to the well fluid at the surface and is then circulated in the well fluid to a down hole location.

* * * * *